US011489180B2

(12) United States Patent
Min et al.

(10) Patent No.: US 11,489,180 B2
(45) Date of Patent: Nov. 1, 2022

(54) SYSTEM AND METHOD FOR DETERMINING HYDROGEN SUPPLY FAILURE OF FUEL CELL

(71) Applicants: HYUNDAI MOTOR COMPANY, Seoul (KR); KIA MOTORS CORPORATION, Seoul (KR)

(72) Inventors: Boung Ho Min, Yongin-si (KR); Dong Hun Lee, Anyang-si (KR); Soon Woo Kwon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 241 days.

(21) Appl. No.: 16/828,467

(22) Filed: Mar. 24, 2020

(65) Prior Publication Data
US 2021/0126270 A1 Apr. 29, 2021

(30) Foreign Application Priority Data
Oct. 23, 2019 (KR) .................. 10-2019-0131887

(51) Int. Cl.
*H01M 8/04664* (2016.01)
*H01M 8/04082* (2016.01)
(Continued)

(52) U.S. Cl.
CPC ......... *H01M 8/04686* (2013.01); *B60L 50/72* (2019.02); *H01M 8/04201* (2013.01);
(Continued)

(58) Field of Classification Search
CPC .......... B60L 1/02; B60L 3/0053; B60L 50/72; B60L 7/18; H01M 2250/20;
(Continued)

(56) References Cited

U.S. PATENT DOCUMENTS

2016/0114793 A1* 4/2016 Saito ................. B60W 20/50
701/22
2017/0352903 A1* 12/2017 Yoshimura ........ H01M 8/04753

FOREIGN PATENT DOCUMENTS

| JP | 3864875 B2 | 1/2007 |
|----|------------|--------|
| JP | 5790564 B2 | 10/2015 |

(Continued)

OTHER PUBLICATIONS

Yoon et al., Hydrogen Tank Defect Detecting Device and Method thereof for Fuel Cell Vehicle System, machine translation by Espacenet (Year: 2008).*

*Primary Examiner* — Adam A Arciero
(74) *Attorney, Agent, or Firm* — McDonnell Boehnen Hulbert & Berghoff LLP

(57) ABSTRACT

Disclosed is a system for determining a hydrogen supply failure of a fuel cell, the system including: a fuel cell, a plurality of hydrogen tanks having hydrogen, a hydrogen supply line connected to the hydrogen tanks and supplying hydrogen from the hydrogen tanks to the fuel cell, a plurality of tank valves mounted on the hydrogen tanks, respectively, and discharging hydrogen in the hydrogen tanks to the hydrogen supply line when opening, a pressure sensor sensing pressure in the hydrogen supply line, and a determiner determining poor opening of the hydrogen tanks on the basis of pressure information sensed by the pressure sensor.

5 Claims, 3 Drawing Sheets

(51) Int. Cl.
   *H01M 8/04746* (2016.01)
   *B60L 50/72* (2019.01)
   *H01M 8/0438* (2016.01)

(52) U.S. Cl.
   CPC ... *H01M 8/04388* (2013.01); *H01M 8/04753* (2013.01); *H01M 2250/20* (2013.01)

(58) Field of Classification Search
   CPC ......... H01M 8/04201; H01M 8/04388; H01M 8/04686; H01M 8/04753; Y02E 60/32; Y02E 60/50; Y02T 90/40
   See application file for complete search history.

(56) References Cited

FOREIGN PATENT DOCUMENTS

| | | |
|---|---|---|
| KR | 10-0837933 B1 | 6/2008 |
| KR | 2015-0072665 A | 6/2015 |
| KR | 10-1734649 B1 | 5/2017 |

\* cited by examiner

SYSTEM AND METHOD FOR DETERMINING HYDROGEN SUPPLY FAILURE OF FUEL CELL

CROSS REFERENCE TO RELATED APPLICATIONS

The present application claims priority to Korean Patent Application No. 10-2019-0131887, filed on Oct. 23, 2019, the entire contents of which is incorporated herein for all purposes by this reference.

BACKGROUND

Field

The present disclosure relates to a system and method for determining a hydrogen supply failure of a fuel cell.

Description of the Related Art

Whether a tank valve mounted in all hydrogen tanks in fuel cell vehicles equipped with a plurality of hydrogen tanks is normally opened is a factor that determines the driving range of a fuel cell vehicle.

According to hydrogen tanks in the related art, a fuel cell is started to operate under the assumption that a tank valve is open only on the basis of an electrical signal of the valve after the tank valve is instructed to open without checking whether the tank valve is normally open.

Only when normal opening of all tank valves is ensured, fuel cell vehicles such as a tram, a train, and a truck in which a driving range per charging is important can reach a destination or complete a planned course.

However, there is a problem in the related art that it is impossible to sense that a tank valve is not actually open even though an electrical signal of the tank valve is normal.

The description provided above as a related art of the present disclosure is just for helping understanding the background of the present disclosure and should not be construed as being included in the related art known by those skilled in the art.

SUMMARY

An object of the present disclosure is to provide a system and method for determining a hydrogen supply failure of a fuel cell, the system and method determining whether a tank valve of a hydrogen tank is normally opened by sensing pressure in a hydrogen supply line when hydrogen is supplied to a fuel cell.

A system for determining hydrogen supply failure of a fuel cell according to the present disclosure for achieving the object includes: a fuel cell; a plurality of hydrogen tanks having hydrogen; a hydrogen supply line connected to the hydrogen tanks and supplying hydrogen from the hydrogen tanks to the fuel cell; a plurality of tank valves mounted on the hydrogen tanks, respectively, and discharging hydrogen in the hydrogen tanks to the hydrogen supply line when opening; a pressure sensor provided in the hydrogen supply line for sensing pressure in the hydrogen supply line; and a determiner determining poor opening of the hydrogen tanks on the basis of pressure information sensed by the pressure sensor.

The system may further include a valve controller discharging hydrogen to the hydrogen supply line by individually controlling the tank valves.

The valve controller may control a plurality of tank valves such that the tank valves are sequentially opened in a predetermined order and the determiner may determine poor opening of hydrogen tanks on which the tank valves that have been controlled to open are mounted.

The valve controller may control only some of a plurality of tank valves to open and the determiner may determine poor opening of hydrogen tanks on which the some tank valves that have been controlled to open are mounted.

The determiner may determine poor opening of the hydrogen tanks on the basis of a pressure change amount in the hydrogen supply line sensed by the pressure sensor when the fuel cell consumes hydrogen.

When a pressure change amount sensed for a predetermined time by the pressure sensor with the tank valves open exceeds a predetermined change valve, the determiner may determine poor opening of corresponding hydrogen tanks.

The system may further include a controller controlling an operation of a vehicle equipped with the fuel cell on the basis of determination by the determiner, and the controller may correct a driving range on the basis of the number of hydrogen tanks with poor opening determined by the determiner.

The system may further include a controller controlling an operation of a vehicle equipped with the fuel cell on the basis of determination by the determiner, and the controller may increase a regenerative braking amount of a vehicle, limit an output value of an air-conditioning system, or limit an output value of a vehicle motor when the determiner determines poor opening of tanks.

A method of determining a hydrogen supply failure of a fuel cell according to the present disclosure for achieving the objects includes: a valve control step of discharging hydrogen to a hydrogen supply line by individually controlling tank valves mounted on a plurality of hydrogen tanks, respectively; a pressure sensing step sensing pressure in the hydrogen supply line; and a determining step of determining poor opening of the hydrogen tanks on the basis of pressure information sensed in the pressure sensing step.

The valve control step may control a plurality of tank valves such that the tank valves are sequentially opened in a predetermined order and the determining step may determine poor opening of hydrogen tanks on which the tank valves that have been controlled to open are mounted.

The valve control step may control only some of a plurality of tank valves to open and the determining step may determine poor opening of hydrogen tanks on which the tank valves that have been controlled to open are mounted.

When a pressure change amount sensed for a predetermined time by the pressure sensor with the tank valves open exceeds a predetermined change valve, the determining step may determine poor opening of corresponding hydrogen tanks.

The method may further include a control step of controlling an operation of a vehicle equipped with the fuel cell on the basis of determination by the determining step, and the control step may correct a driving range on the basis of the number of hydrogen tanks with poor opening determined in the determining step.

The method may further include a control step of controlling an operation of a vehicle equipped with the fuel cell on the basis of determination by the determining step, wherein the control step may control to increase a regenerative braking amount of a vehicle, limit an output value of an air-conditioning system, or limit an output value of a vehicle motor when poor opening of tanks is determined in the determining step.

It is possible to accurately and individually determine tanks with poor opening by directly sensing a pressure change amount of a hydrogen supply line to check whether tank valves are open.

It is possible to determine poor opening of tanks through a software sequence without adding a specific hardware feedback signal or a separate sensor.

BRIEF DESCRIPTION OF THE FIGURES

The above and other objects, features and other advantages of the present disclosure will be more clearly understood from the following detailed description when taken in conjunction with the accompanying drawings, in which.

DETAILED DESCRIPTION

Figure 1:
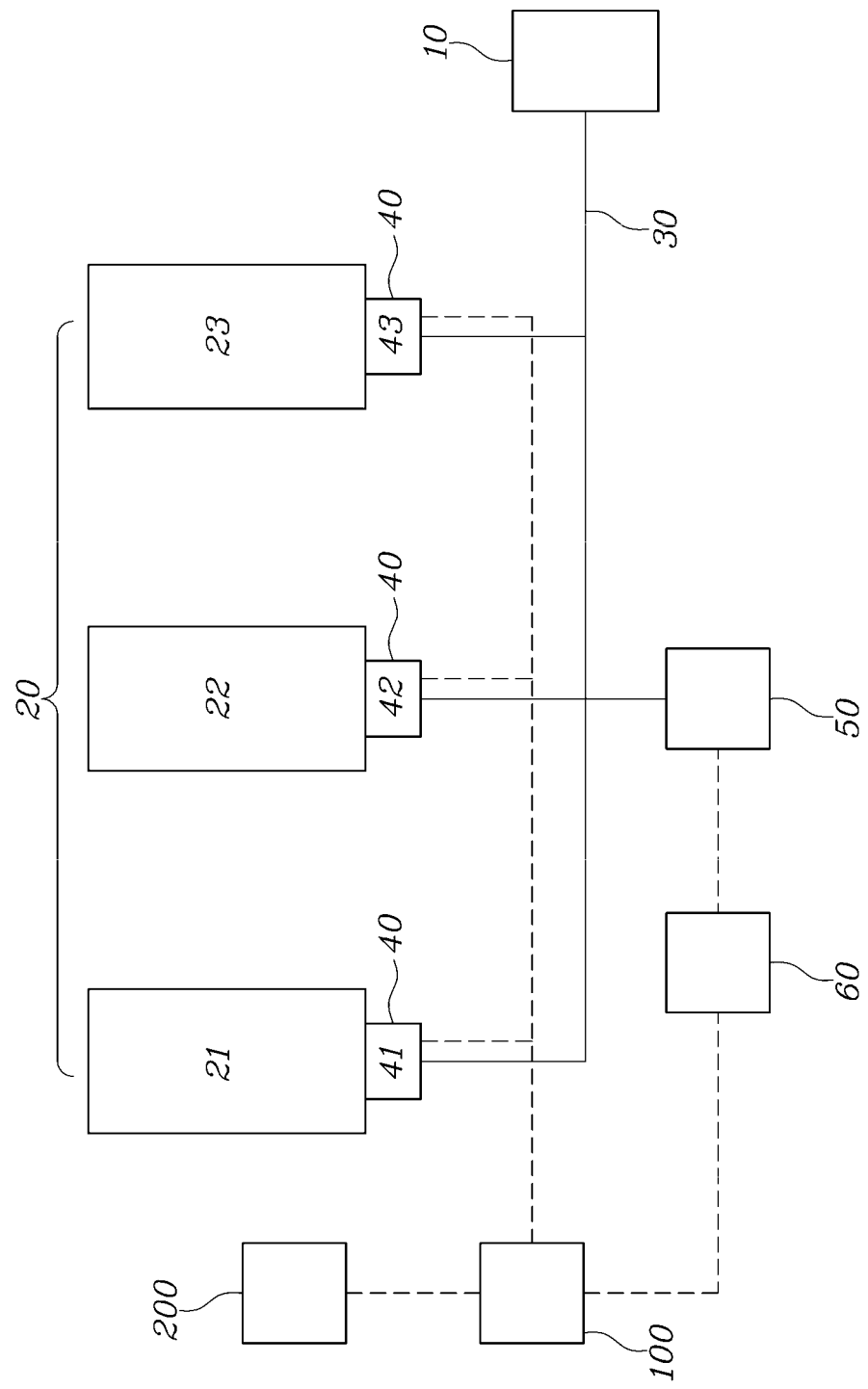
FIG. 1 is a diagram showing the configuration of a system for determining a hydrogen supply failure of a fuel cell according to an embodiment of the present disclosure.

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A determiner 60, a valve controller 100, and a controller according to exemplary embodiments of the present disclosure can be implemented through a nonvolatile memory (not shown) configured to store data about algorithms for controlling operation of various components of a vehicle or about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

The present disclosure will be described hereafter in detail by describing exemplary embodiments of the present disclosure with reference to the accompanying drawings. Like reference numerals given in the drawings indicate like components.

Figure 2:
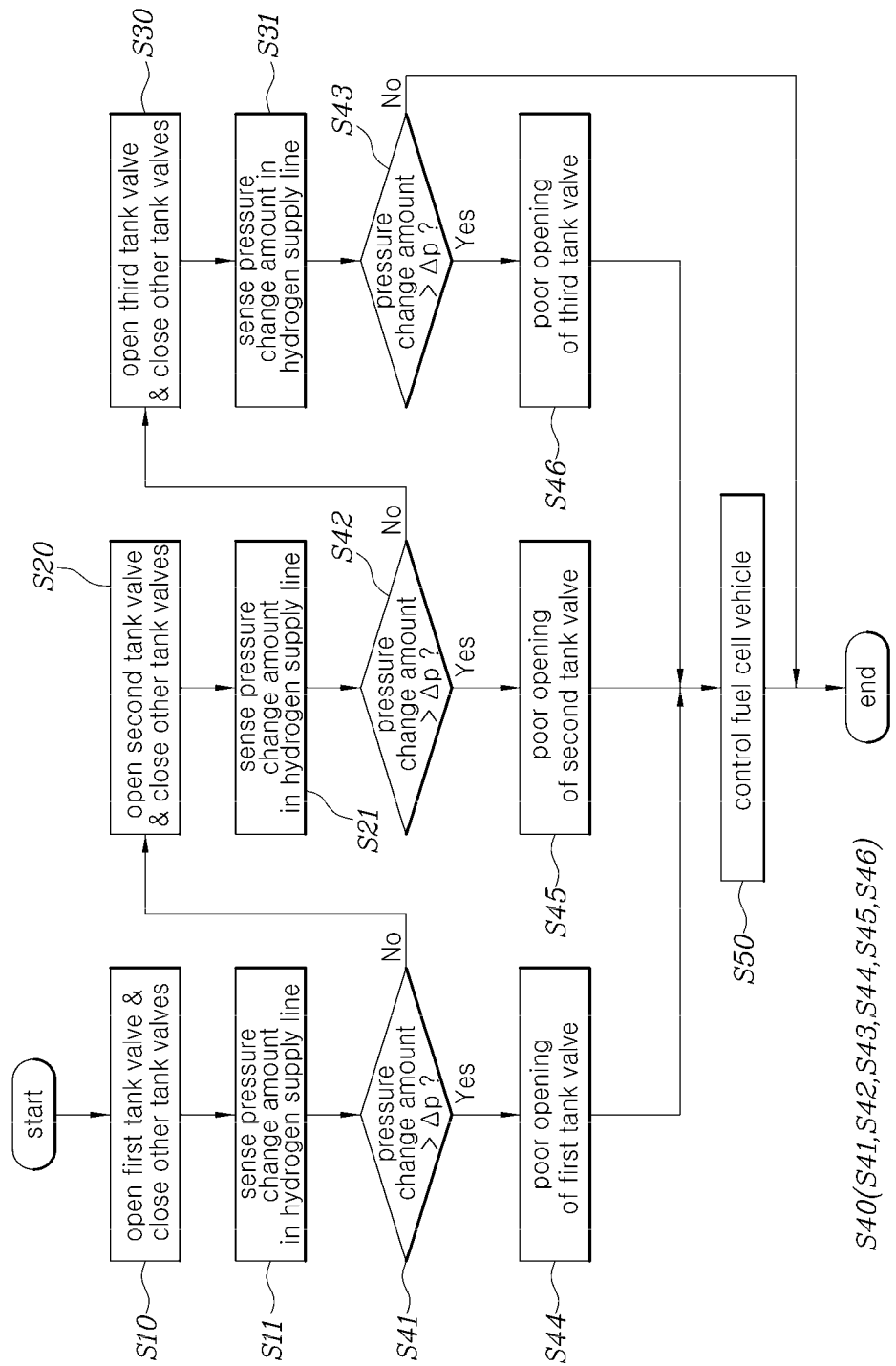
FIG. 2 is a flowchart showing a method of determining a hydrogen supply failure of a fuel cell according to an embodiment of the present disclosure.
Figure 3:
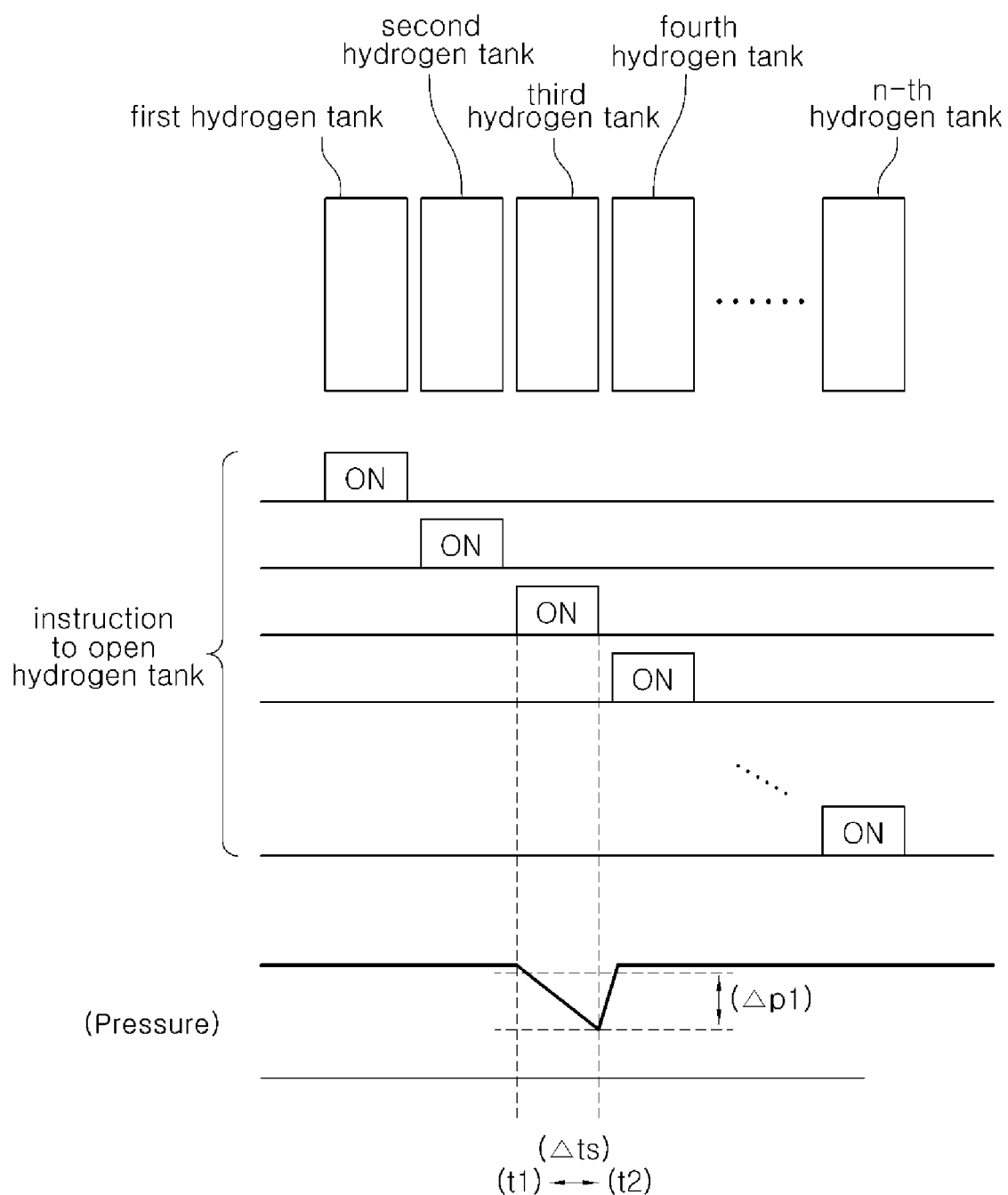
FIG. 3 is a graph showing a pressure change amount measured in a hydrogen supply line when tank valve is controlled to open.

FIG. 1 is a diagram showing the configuration of a system for determining a hydrogen supply failure of a fuel cell 10 according to an embodiment of the present disclosure. FIG. 2 is a flowchart showing a method of determining a hydrogen supply failure of a fuel cell 10 according to an embodiment of the present disclosure. FIG. 3 is a graph showing a pressure change amount measured in a hydrogen supply line 30 when tank valve 40 is controlled to open.

Referring to FIGS. 1 to 3, a system for determining a hydrogen supply failure of a fuel cell 10 according to an embodiment of the present disclosure for achieving the objects includes: a fuel cell 10; a plurality of hydrogen tanks 20 having hydrogen; a hydrogen supply line 30 connected to the hydrogen tanks 20 and supplying hydrogen from the hydrogen tanks 20 to the fuel cell 10; a plurality of tank valves 40 mounted on the hydrogen tanks 20, respectively, and discharging hydrogen in the hydrogen tanks 20 to the hydrogen supply line 30 when opening; a pressure sensor 50 provided in the hydrogen supply line 30 sensing pressure in the hydrogen supply line 30; and a determiner 60 determining poor opening of the hydrogen tanks 20 on the basis of pressure information sensed by the pressure sensor 50. The system further includes a valve controller 100 discharging hydrogen to the hydrogen supply line 30 by individually controlling the tank valves 40.

The hydrogen tanks 20, the tank valves 40, the pressure sensor 50, and the fuel cell 10 are connected to the hydrogen supply line 30, and the pressure sensor 50, the determiner 60, the valve controller 100, and the controller are connected to a control line.

The valve controller 100 controls a plurality of tank valves 40 such that the tank valves 40 are sequentially opened in a predetermined order and the determiner 60 determines poor opening of the hydrogen tanks 20 on which the tank valves 40 that have been controlled to open are mounted. The valve controller 100 controls only some of the tank valves 40 to open and the determiner 60 determines poor opening of the hydrogen tanks 20 on which the some tank valves 40 that have been controlled to open are mounted.

The determiner 60 can determine poor opening of the hydrogen tanks on the basis of a pressure change amount in the hydrogen supply line 30 sensed by the pressure sensor when the fuel cell 10 consumes hydrogen.

When a pressure change amount sensed for a predetermined time by the pressure sensor 50 with the tank valves 40 open exceeds a predetermined change valve, the determiner 60 determines poor opening of corresponding hydrogen tanks 20.

It can be seen from FIG. 3 that a change in pressure when some tank valves 40 are instructed to open is confirmed. When the fuel cell 10 operates and consumes hydrogen and the tank valves 40 of the hydrogen tanks 20 are opened, the pressure in the hydrogen supply line 30 is maintained at a predetermined level by hydrogen consumption by the fuel cell 10 and hydrogen supply from the hydrogen tanks 20.

When the tank valves 40 are opened and a pressure change amount is smaller than a predetermined value for a predetermined time due to uniform pressure in the hydrogen supply line 30, the determiner 60 determines that the tank valves 40 are normally open. However, when the tank valves 40 are not opened, the fuel cell 10 consumes the hydrogen in the hydrogen supply line 30 and hydrogen is not supplied from the hydrogen tanks 20. Accordingly, a pressure change amount for a predetermined time exceeds the predetermined value and the determiner 60 determines that there is an opening failure of the tank valves 40 that have been instructed to open by the valve controller 100.

Accordingly, there is an effect that when electrical signals from the tank valves 40 show a normal operation but there is actually a failure, it is possible to determine a failure of the tank valves 40.

Thus, it is possible to determine a failure of all the tank valves 40 by applying the process described above to all the hydrogen tanks 20.

The system further includes a controller 200 for controlling the operation of a vehicle equipped with the fuel cell 10 on the basis of determination by the determiner 60, and the controller corrects a driving range on the basis of the number of hydrogen tanks 20 with poor opening determined by the determiner 60.

For example, when there are n tank valves 40 of the hydrogen tanks 20, a driving range is corrected by multiplying an existing driving range by (1−1/n).

When the determiner 60 determines poor opening of tanks, the controller 200 increases a regenerative braking amount of a vehicle, limits an output value of an air-conditioning system, or limits an output value of a vehicle motor.

For example, it is possible to check a regenerative braking amount according to a speed and it is possible to increase the regenerative braking amount as the number of tank valves 40 with a failure increases.

For example, it is possible to limit an output value of an air-conditioning system to 0.7 of the existing output value of the air-conditioning system.

For example, it is possible to control a change of an inclination of torque for each predetermined step according to limit of an output value of a vehicle motor.

Referring to FIG. 2, a method of determining a hydrogen supply failure of a fuel cell 10 according to an embodiment of the present disclosure for achieving the objects includes: a valve control step S10, S20, S30 of discharging hydrogen to a hydrogen supply line 30 by individually controlling tank valves 40 mounted on a plurality of hydrogen tanks 20, respectively; a pressure sensing step S11, S21, S31 of sensing pressure in the hydrogen supply line 30; and determining step S40 (which includes steps S41, S42, S43, S44, S45, and S46) of determining poor opening of the hydrogen tanks 20 on the basis of pressure information sensed in the pressure sensing step.

The valve control step S10, S20, S30 controls the tank valves 40 such that the tank valves 20 are sequentially opened in a predetermined order and the determining step S40 determines poor opening of the hydrogen tanks 20 on which the tank valves 40 that are controlled to open are mounted.

The valve control step S10, S20, S30 controls the tank valves 40 such that only some of the tank valves 20 are opened and the determining step S40 determines poor opening of the some of the hydrogen tanks 20 on which the tank valves 40 that are controlled to open are mounted.

When a pressure change amount sensed for a predetermined time by the pressure sensor 50 with the tank valves 40 open exceeds a predetermined change valve, the determining step S40 determines poor opening of corresponding hydrogen tanks 20.

The determining step S40 includes a step S41, S42, S43 of determining whether a sensed pressure change amount exceeds a predetermined pressure change amount and a step S44, S45, S46 of determining poor opening of each hydrogen tanks on the basis of the step S41, S42, S43.

It is possible to determine poor opening of all the tank valves 40 by performing the valve control step S10, S20, S30, the pressure sensing step S11, S21, S31, the determining step S40 to every tank valves 40.

The method further includes a control step S50 of controlling the operation of a vehicle equipped with the fuel cell 10 on the basis of determination by the determining step S40, and the control step S50 corrects a driving range on the basis of the number of hydrogen tanks 20 with poor opening determined in the determining step S40.

The method further includes a control step S50 of controlling the operation of a vehicle equipped with the fuel cell 10 on the basis of determination by the determining step S40, and the control step S50 increases a regenerative braking amount of a vehicle, limits an output value of an air-conditioning system, or limits an output value of a vehicle motor when poor opening of tanks is determined in the determining step.

Although the present disclosure was provided above in relation to specific embodiments shown in the drawings, it is apparent to those skilled in the art that the present disclosure may be changed and modified in various ways without departing from the scope of the present disclosure, which is described in the following claims.

The invention claimed is:

1. A method of determining a hydrogen supply failure of a fuel cell, the method comprising:
a valve control step of discharging hydrogen to a hydrogen supply line by individually controlling tank valves mounted on a plurality of hydrogen tanks, respectively;
a pressure sensing step sensing pressure in the hydrogen supply line; and
a determining step of determining poor opening of the hydrogen tanks on the basis of pressure information sensed in the pressure sensing step;
wherein when a pressure change amount sensed for a predetermined time by the pressure sensor with the tank valves open exceeds a predetermined change value, the determining step determines poor opening of corresponding hydrogen tanks.

2. The method of claim 1, wherein the valve control step controls a plurality of tank valves such that the tank valves are sequentially opened in a predetermined order and the determining step determines poor opening of hydrogen tanks on which the tank valves that have been controlled to open are mounted.

3. The method of claim 1, wherein the valve control step controls only some of a plurality of tank valves to open and the determining step determines poor opening of hydrogen tanks on which the tank valves that have been controlled to open are mounted.

4. The method of claim 1, further comprising a control step of controlling an operation of a vehicle equipped with the fuel cell on the basis of determination by the determining step, and the control step corrects a driving range on the basis of the number of hydrogen tanks with poor opening determined in the determining step.

5. The method of claim 1, further comprising a control step of controlling an operation of a vehicle equipped with the fuel cell on the basis of determination by the determining step, wherein the control step controls to increase a regenerative braking amount of a vehicle, limit an output value of an air-conditioning system, or limit an output value of a vehicle motor when poor opening of tanks is determined in the determining step.

* * * * *